Patented Dec. 27, 1938

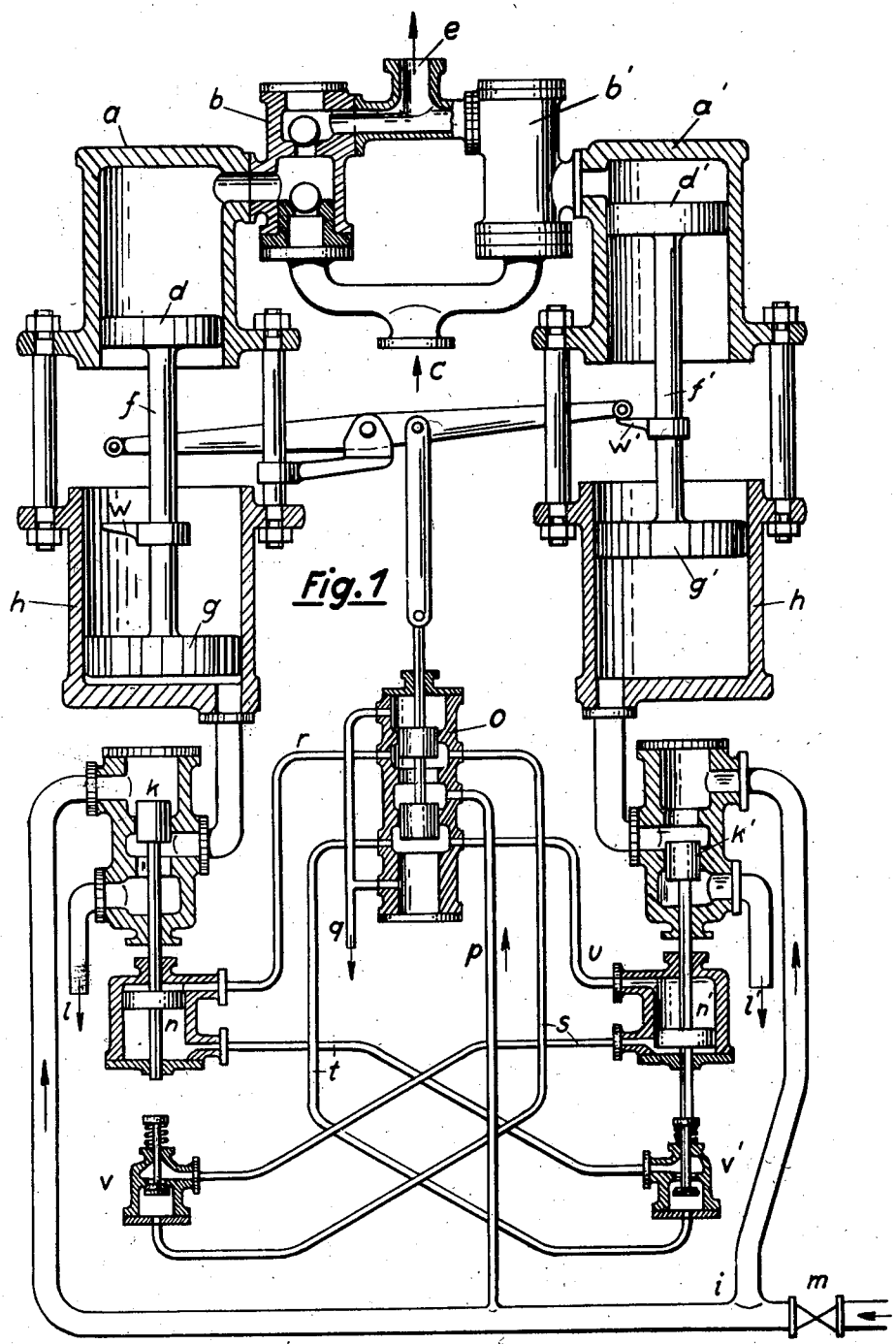

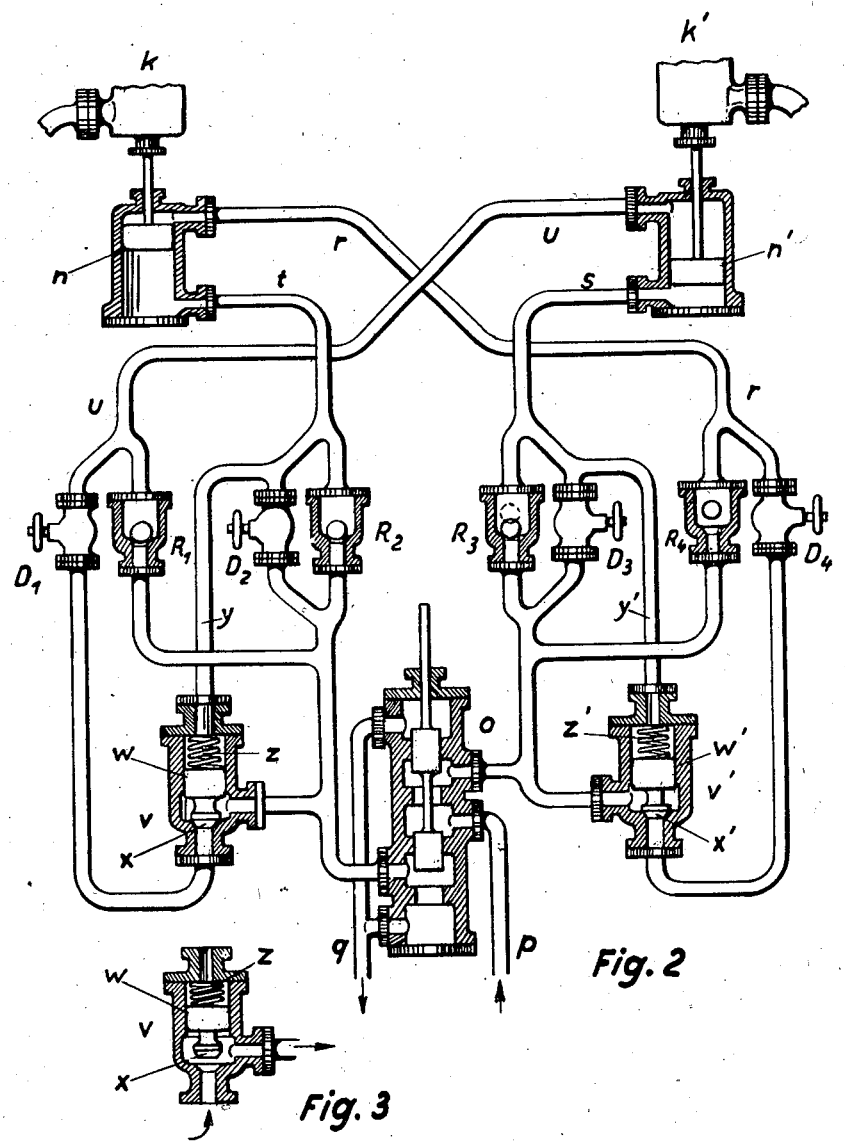

2,141,731

UNITED STATES PATENT OFFICE 2,141,731

DOUBLE CYLINDER WATER PRESSURE ENGINE AND PISTON PUMP ACTUATED THEREBY

Ulrich Wolfrom and Franz Koehler, Leuna, Germany, assignors to I. G. Farbenindustrie Aktiengesellschaft, Frankfort-on-the-Main, Germany Application May 8, 1936, Serial No. 78,570
In Germany May 11, 1935

4 Claims. (Cl. 121—115)

The present invention relates to double cylinder water pressure engine and piston pump actuated thereby.

Circulating pumps are already used for the pauseless, uniform movement of liquids and gases. This type of pump has the drawback, however, especially when overcoming high pressures, that its degree of efficiency is low. Very much better degrees of efficiency are obtained with piston pumps. If a piston be driven by a crank, however, the amount of liquid or gas moved follows the course of a sine curve. It is therefore usual to drive two, three or more pistons by cranks which are arranged at a suitable angle to each other. The irregularity which always still exists is, however, considerable so that for many purposes it is necessary to interpose equalizing devices, as for example air vessels. When high pressures are employed and large amounts of liquid or gas are moved, however, such equalizing devices frequently form the source of technical difficulties and furthermore they are very expensive.

It is already known that during the power stroke of a piston a sufficiently uniform movement can be obtained if the pump piston be driven not by a crank but by another piston which is driven by a gaseous, vaporous or liquid pressure agent, i. e., a pressure agent having a hydraulic action. The moving power of such a cylinder falls to zero, however, during the time which is necessary for the reversal of the direction of the piston.

Pumps have already also been used which are fitted with two simple-acting cylinders with which the main control devices connected with the single cylinders are so controlled by means of mechanical devices that the one piston does not change over until the other piston has already begun its power stroke. Mechanical control devices of the said kind which have rather a complicated construction will hardly ensure safety in operation, particularly when used in connection with pumps of large dimensions and yielding a high delivery pressure.

As it is known the control of two co-operating simple-acting cylinders may also be effected by using the movement of the piston which is just exercising its power stroke, for the operation, just before the said power stroke is completed, of an auxiliary controlling device which is common to the two cylinders. The said auxiliary controlling device provides for the supply of the controlling liquid to the two main controlling devices which now effect the control of the hydraulic driving cylinders.

The hydraulic actuation of the main control device by means of an auxiliary control device mechanically driven by the movement of the pump pistons, when used for machines for high delivery pressures and high efficiency, as for example from 1000 to 2000 H. P. with delivery pressures of 200 atmospheres and more, is to be preferred to the immediate actuation for its simplicity and safety in operation. The said pumps however were hitherto attended with the drawback that the supply of the pressure liquid was stopped for a certain time during the operation of the control members, because the piston exercising its power stroke is stopped until the other piston commences its power stroke. Even though the pause thus caused is only of a short duration, it nevertheless leads to considerable inconveniences in operation when the said pumps are used in certain fields of application.

We have now found that also in the case of a single auxiliary control device pauseless movement can be obtained by interposing in the two liquid conduits between the auxiliary controlling slide and the two main controlling slides hydraulically actuated by the former, a stop member of the type of a check valve which prevents the movement of that main controlling slide which is to effect the reflux of the piston which is in its power stroke, until the change-over of the other pump piston which is to commence its power stroke, has taken place.

A preferable arrangement results when the stop devices arranged on the liquid conduits between the auxiliary controlling slide and the two main controlling slides are alternately opened each time by the stroke movement of the main controlling slide of that working cylinder which is to carry out the next power stroke.

The nature of the invention will be further described with reference to the accompanying drawings which illustrate arrangements of apparatus according to this invention but the invention is not restricted to the particular arrangements shown.

Referring to Figure 1, which shows diagrammatically by way of example a double cylinder water pressure engine and a double cylinder piston pump actuated thereby with the necessary controlling elements, the working chambers of the two pump cylinders $a$, $a'$ are each connected with a valve chest $b$, $b'$. The suction valves of these valve chests are connected with the inlet pipe $c$ for the liquid into which the liquid to be moved is pressed with a moderate pressure, as for example by means of a circulating pump (not shown). The liquid is moved by the pistons $d$ and $d'$ from the cylinders $a$ and $a'$ through the pressure valves of the valve chest $b$, $b'$ into the pressure conduit $e$. The pistons $d$ and $d'$ are connected by strong piston rods $f$, $f'$ with the driving pistons $g$, $g'$ of the water pressure engine. The driving pistons $g$, $g'$ move in the cylinders $h$, $h'$ of the water pressure engine. The necessary pressure liquid is distributed to the cylinders $h$, $h'$ through a branched pipe $i$ and the main controlling slides $k$, $k'$ and escapes through the pipes $l$, $l'$ at the end of the working stroke. The working liquid, which is either brought to the pressure necessary for the purpose of driving by a special pump, or is an available liquid which in any case would have to be released from pressure, or is withdrawn from a natural pressure fall (water power), passes through the control valve $m$ to the main control slides $k$, $k'$.

The main control slides $k$, $k'$ are actuated by the control pistons $n$, $n'$. These control pistons are driven by pressure liquid which is distributed to them by the auxiliary control slide $o$. The pressure liquid is supplied to the auxiliary control slide through a pipe $p$ and after operating the control pistons $n$, $n'$ escapes through a pipe $q$. The connections between the chambers of the auxiliary control slide $o$, and the cylinders of the control pistons $n$, $n'$ is made by the pipes $r$, $s$, $t$, $u$. In the connecting pipe $s$ is interposed a stop member $v$ in the form of a springloaded valve and the stop member $v'$ is interposed in the same way in the connecting pipe $t$. The stop members $v$, $v'$ are arranged for example so that the valve $v$ is opened by the outwardly moving piston rod of the control piston $n$ shortly before it reaches its lowermost position, the valve $v'$ being actuated in a similar manner by the piston rod of the control piston $n'$. When the pistons $n$, $n'$ move upwardly, the stop members $v$, $v'$ are closed again by their springs.

The movement of the auxiliary control slide $o$ is effected in known manner by means of suitable rods alternately by lugs $w$, $w'$ secured to the piston rods $f$, $f'$.

In the drawings, the machine is shown in that position in which the piston $g$ of the water pressure engine is at the lowermost point of its stroke. The piston $g'$ is still in its power stroke but has already moved the auxiliary control slide $o$ by means of the lug $w'$ to such an extent that the pressure liquid entering through the pipe $p$ already has access to the pipes $r$ and $s$. The control piston $n$ immediately commences its control stroke because the stop member $v'$ is held open by the piston rod of the control piston $n'$ and therefore the control liquid beneath the piston $n$ can escape through the pipe $t$, the casing of the auxiliary control slide $o$ and the outlet pipe $q$. When the main control slide $k$ has moved down, the space beneath the piston $g$ within the cylinder $h$ is placed in communication with the pipe $i$ and therefore the power stroke of the piston $g$ begins. At this moment, the power stroke of the other side of the pump has not yet reached its conclusion because the control piston $n'$ cannot yet carry out its controlling action. At the end of the movement of the control piston $n$ the protruding end of its piston rod opens the stop member $v$. Consequently the pipe $s$ is only then made open and the control piston $n'$ can only then cause the reversal of the side of the pump concerned.

After the reversal, the return stroke of the piston of the pump concerned takes place by the distribution through the inlet pipe $c$ of the liquid to be moved with a sufficient pressure into the pump cylinder to be filled through the suction valve of the valve chest $b$ or $b'$. This amount of liquid is so measured that the return stroke is already ended before the lug $w$ or $w'$ of the piston which is performing its power stroke actuates the auxiliary control member $o$.

If the flow resistances behind the regulating valve $m$ to the pistons $g$, $g'$ on the one hand and between the pistons $d$, $d'$ to the pipe $e$ on the other hand are sufficiently small, it results that in the short time during which the two pistons $d$, $d'$ are in their power stroke at the same time, only a very slight increase in the momentary amount of movement takes place. Therefore the liquid to be moved which is under pressure leaves the pipe $e$ without pause and in a practically uniform current. Similarly the supply of driving liquid through the regulating valve $m$ takes place in an uninterrupted uniform flow.

The said problem is thus entirely solved by the said pump.

A very far-reaching independence in the spatial arrangement of the necessary control elements is obtained by so proceeding that the two stop members $v$, $v'$ in the pipes between the auxiliary control slide $o$ and the two main controlling slides $k$, $k'$ are alternately kept closed by the stock pressure of the control liquid coming from that main control member which is to start the new power stroke.

A control of this nature is indicated diagrammatically in Figure 2. Reference letters $k$, $k'$, $n$, $n'$, $o$, $p$, $q$, $v$ and $v'$ have the same meaning as in Figure 1. The reference letters $r$, $s$, $t$ and $u$ again indicate the connecting pipes between $o$ and $n$ or $n'$, but each of the pipes has a branching. In one branch there is provided a check valve ($R_1$, $R_2$, $R_3$ and $R_4$) which allows the unhindered flow of the control liquid from the auxiliary control member $o$ to the side of the control piston concerned. In the other branch there is provided a throttle valve ($D_1$, $D_2$, $D_3$ and $D_4$) through which the control liquid runs to the opened part of the auxiliary control slide and then escapes through the pipe $q$, because the check valves $R_1$, $R_2$, $R_3$ and $R_4$ do not allow a return flow.

The throttle valves $D_1$, $D_2$, $D_3$ and $D_4$ may be of the usual type, the free passages of which are so adjusted that the liquid coming from the control pistons $n$, $n'$ can flow to the auxiliary control member $o$ and to the exhaust pipe $q$ at such a rate that the velocities of the control pistons $n$, $n'$ cannot exceed a desired limit.

In the branch of the pipe in which is situated $D_1$, a stop member $v$ is provided in the form of an overflow valve. On the cone of this valve there is a piston $w$ the diameter of which is greater than that of the valve cone and which is pressed downwards by a spring $z$ which provides for a tight closure of the valve if no liquid is flowing. The space above the piston $w$ is in connection with the part of the connecting pipe $t$ between $D_2$ and the space below the piston $n$. A corresponding arrangement is provided including $D_4$, $v'$, $x'$, $w'$, $s$, $D_3$ and $n'$.

If the auxiliary control slide $o$ is brought into the position shown in Figure 2, the liquid flowing through $p$ can pass through the check valve $R_4$ which readily opened and the pipe $r$ to the space above the control piston $n$. The liquid on the under side of the control piston $n$ can flow away through the throttle valve $D_2$ to the auxiliary control member $o$ and escape through the pipe $q$ while at the same time the liquid cannot pass the check valve $R_2$. The stock pressure in front of $D_2$ passes through pipe $y$ to the upper side of the piston of the stop member $v$ and keeps this closed at first.

The pressure liquid entering at $p$ can pass through $R_3$ and the pipe $s$ to below the piston $n'$. The liquid above $n'$, however, cannot flow away through the pipe $u$ and the throttle valve $D_1$ as long as the stop member $v$ is closed. It is only when the piston $n$ has completed its control stroke that the stock pressure in front of the throttle valve $D_2$ disappears, whereupon the overflow valve $v$ is released (cf. Figure 3) and $n'$ can then carry out its control stroke.

What we claim is:

1. Apparatus comprising a double cylinder piston pump, a double cylinder water engine connected to said pump for activating said pump, a main control slide associated with each cylinder of said engine for controlling the flow of the operating fluid thereto, a piston for operating each slide, a cylinder for each piston, an auxiliary control for regulating the flow of operating fluid to the cylinders of said main control slides, a casing for said auxiliary slide, connections including the casing of said auxiliary slide for placing the top of one cylinder of a main control slide in communication with the bottom of the other and the top of the latter with the bottom of the former, a stop valve in each connection controlled by a piston of a main control slide and operable at the end of the outstroke thereof to effect movement of the piston of the other main control slide, and means for causing operation of said auxiliary control slide by the pistons of said engine.

2. Apparatus comprising a double cylinder piston pump, a double cylinder water engine connected to said pump for activating said pump, a main control slide associated with each cylinder of said engine for controlling the flow of the operating fluid thereto, a piston for operating each slide, a cylinder for each piston, an auxiliary control for regulating the flow of operating fluid to the cylinders of said main control slides, a casing for said auxiliary slide, connections including the casing of said auxiliary slide for placing the top of one cylinder of a main control slide in communication with the bottom of the other and the top of the latter with the bottom of the former, a check valve in each connection, means carried by the piston of each main control slide for opening a check valve at the end of its outstroke and means for causing operation of said auxiliary control slide by the pistons of said engine.

3. An apparatus as defined in claim 1 wherein the parts are so correlated that the main control slide associated with the engine cylinder about to carry out the new power stroke operates to open its associated stop valve.

4. An apparatus as recited in claim 1 including direct connections from the cylinders of the main control slides to the top of their associated stop valves and a direct connection from the cylinder of each main control slide to the bottom of the stop valve associated with the other main control slide, whereby the pressure of the fluid discharging from the bottom of the cylinder of a main control slide operates to maintain the stop valve associated with such main control slide closed against the fluid being discharged from the top of the cylinder of the opposite main control slide.

ULRICH WOLFROM.
FRANZ KOEHLER.